(12) United States Patent
Nagano et al.

(10) Patent No.: US 6,486,879 B1
(45) Date of Patent: Nov. 26, 2002

(54) IMAGE PROCESSING APPARATUS AND METHOD, AND INFORMATION PROVIDING MEDIUM

(75) Inventors: Hidetoshi Nagano, Tokyo (JP); Takahiro Ishii, Tokyo (JP); Takashi Totsuka, Chiba (JP); Naosuke Asari, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/400,389

(22) Filed: Sep. 21, 1999

(30) Foreign Application Priority Data

Sep. 25, 1998 (JP) ............................................ 10-270886

(51) Int. Cl.$^7$ .............................................. G06T 17/00
(52) U.S. Cl. ....................................... 345/420; 629/630
(58) Field of Search ................................ 345/419, 420, 345/630, 629

(56) References Cited

U.S. PATENT DOCUMENTS

| | | | |
|---|---|---|---|
| 5,887,082 A | 3/1999 | Mitsunaga et al. | 382/199 |
| 5,892,853 A | 4/1999 | Hirani et al. | 382/280 |
| 5,974,194 A | 10/1999 | Hirani et al. | 382/262 |
| 5,995,662 A | 11/1999 | Totsuka et al. | 382/199 |
| 6,091,420 A | * 7/2000 | Horikawa et al. | |
| 6,313,838 B1 | * 11/2001 | Deering | |

OTHER PUBLICATIONS

U.S. patent application Ser. No. 08/987,004, filed Dec. 8, 1997.
U.S. patent application Ser. No. 09/209,302, filed Dec. 11, 1998.
U.S. patent application Ser. No. 09/292,281, filed Apr. 15, 1999.
U.S. patent application Ser. No. 09/330,357, filed Jun. 11, 1999.
U.S. patent application Ser. No. 09/346,006, filed Jul. 1, 1999.
U.S. patent application Ser. No. 09/126,075, filed Jul. 30, 1998.
U.S. patent application Ser. No. 09/124,711, filed Jul. 29, 1998.
U.S. patent application Ser. No. 09/126,005, filed Jul. 29, 1998.
U.S. patent application Ser. No. 09/249,566, filed Feb. 9, 1999.

(List continued on next page.)

Primary Examiner—Mark Zimmerman
Assistant Examiner—Kimbinh T. Nguyen
(74) Attorney, Agent, or Firm—Bell, Boyd & Lloyd LLC

(57) ABSTRACT

The invention provides an image processing apparatus and method and an information providing medium by which a three-dimensional model can be plotted accurately. A model data production section performs a model data production process for shape data and surface color data of a measured object in a corresponding relationship to each other to produce model data and outputs the model data to a model data optimization program section. The model data optimization program section performs a model data optimization process for the model data supplied from the model data production section based on conditions such as a size on a display of the measurement object supplied from a model plotting section, an arithmetic processing performance and a data transmission performance to produce optimization model data, and supplies the optimization model data to the model plotting section. The model plotting section causes the optimization model data supplied from the model data optimization section to be plotted on a VRAM and to be displayed on a display unit.

6 Claims, 16 Drawing Sheets

OTHER PUBLICATIONS

P. Debevec et al., "Modeling and Rendering Architecture from Photographs: A Hybrid Geometry–and Image–Based Approach," SIGGRAPH, Aug. 4–9, 1996, pp. 11–20.

B. Becker et al., "Smooth Transistions Between Bump Rendering Algorithms," SIGGRAPH, Aug. 1–6, 1993, pp. 183–190.

J. Foley et al., "Computer Graphics Principles and Practice," Addison–Wesley Publishing, Copyright 1990, Second Edition, pp. 728–731.

J. Foley et al., "Computer Graphics Principles and Practice," Addison–Wesley Publishing, Copyright 1990, Second Edition, pp. 826–829.

A. Glassner, "Principles of Digital Image Synthesis," Morgan Kaufmann Publishers, Inc., Copyright 1995, vol. II, pp. 726–740.

* cited by examiner

F I G. 1
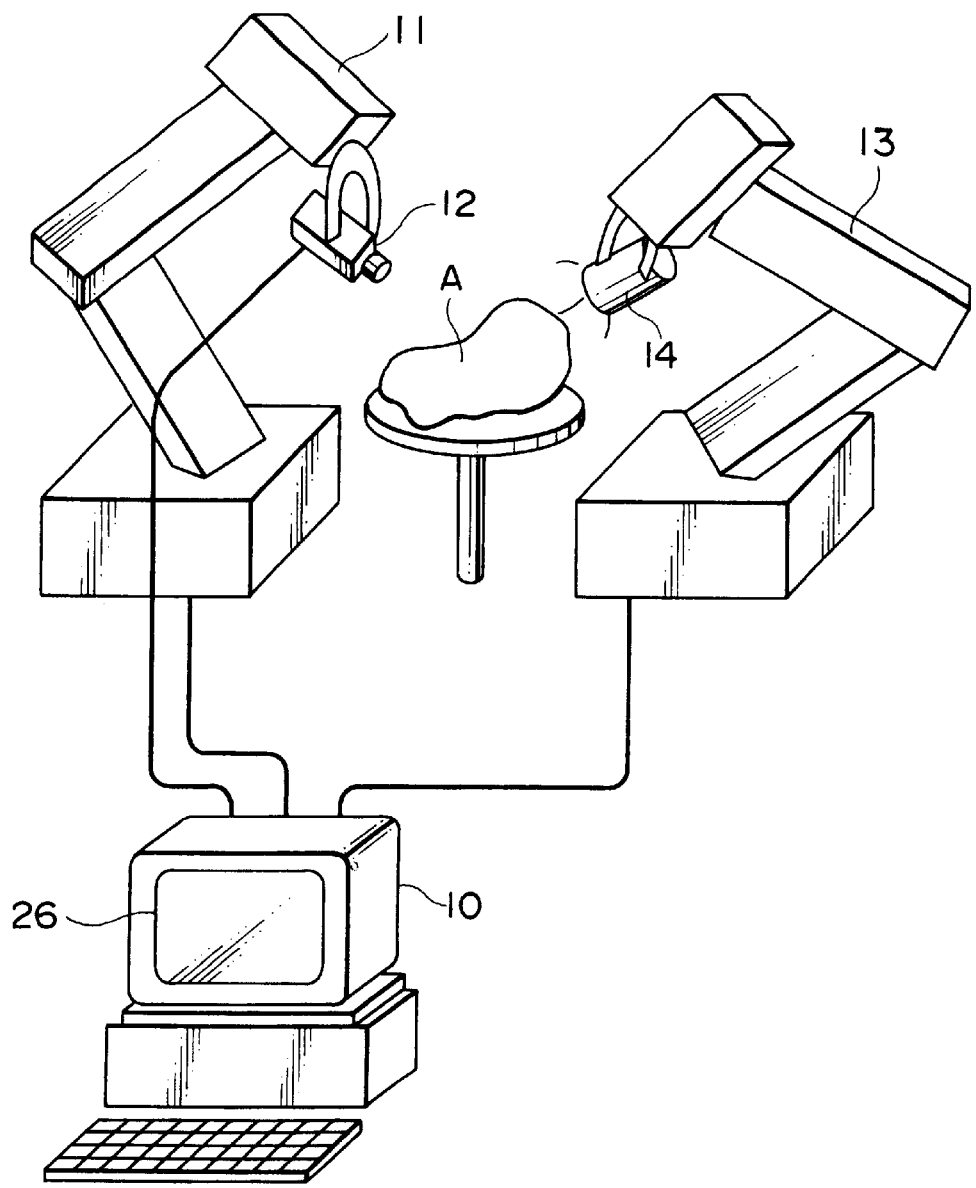

F I G. 2
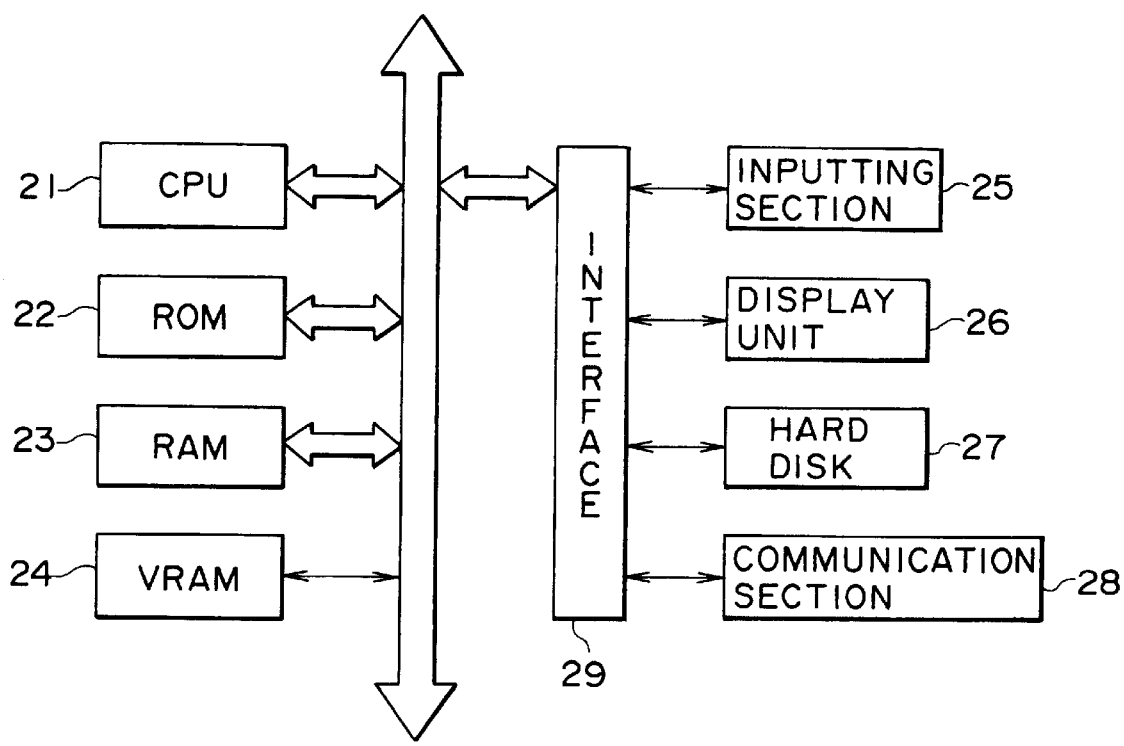
10

FIG. 6
| | MEASUREMENT POSITION 101-1 (VIEWPOINT DIRECTION V-1) | ... | MEASUREMENT POSITION 101-N (VIEWPOINT DIRECTION V-N) |
|---|---|---|---|
| SHAPE DATA | 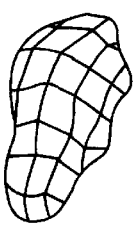 | ... | 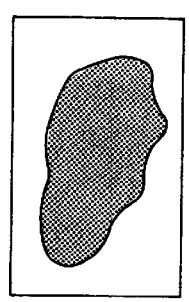 |
| SURFACE COLOR DATA AT LIGHT SOURCE POSITION 102-1 (LIGHT SOURCE DIRECTION L-1) | 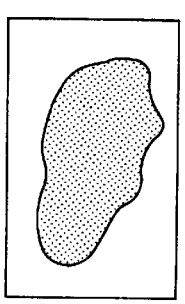 | ... | 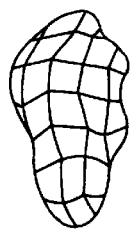 |
| ... | ... | ... | ... |
| SURFACE COLOR DATA AT LIGHT SOURCE POSITION 102-M (LIGHT SOURCE DIRECTION L-M) | 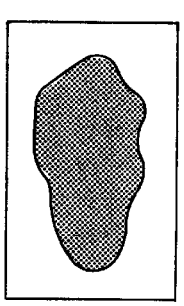 | ... | 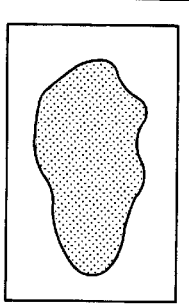 |

FIG.10

| | | PROCESSING EVALUATION ITEMS 201 | | |
|---|---|---|---|---|
| | | PLOTTING QUALITY 211 | PLOTTING PROCESSING LOAD 212 | DATA AMOUNT 213 |
| PLOTTING PROCESSING METHODS | PROTTING PROCESSING METHOD A | ◎ | ◎ | × |
| | PLOTTING PROCESSING METHOD B | ○ | △ | △ |
| | PLOTTING PROCESSING METHOD C | ○ | △ | ○ |
| | PLOTTING PROCESSING METHOD D | △ | ◎ | ◎ |
| PROCESSING SELECTION CONDITIONS | MAGNITUDE OF MODEL ON DISPLAY | CLOSELY RELATED | — | — |
| | ARITHMETIC PROCESSING PERFORMANCE | — | CLOSELY RELATED | — |
| | DATA TRANSFER CAPACITY | — | — | CLOSELY RELATED |

F I G. 15A
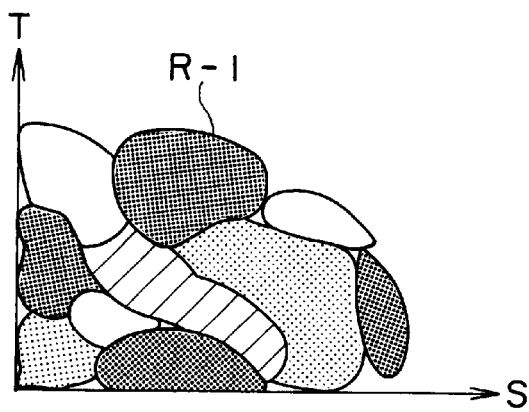
F I G. 15B
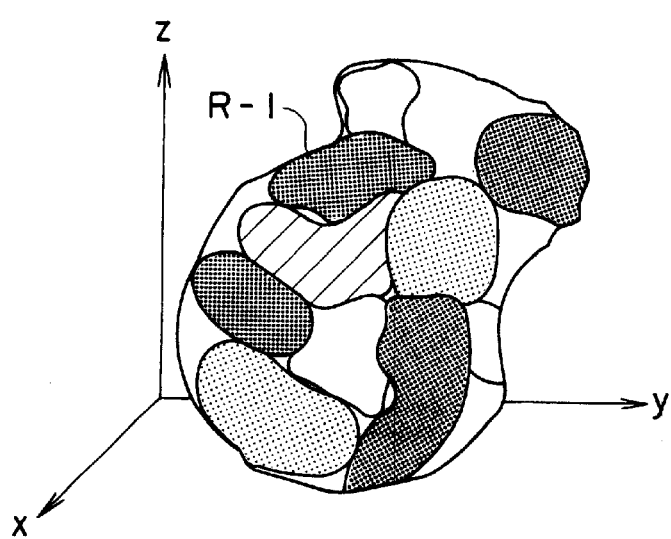

IMAGE PROCESSING APPARATUS AND METHOD, AND INFORMATION PROVIDING MEDIUM

BACKGROUND OF THE INVENTION

This invention relates to an image processing apparatus and method and an information providing medium, and more particularly to an image processing apparatus and method and an information providing medium by which a three-dimensional model can be plotted efficiently and accurately.

Various methods of plotting a three-dimensional model by group approximation data CG (Computer Graphics) have conventionally been developed and include a lighting process or rendering process proposed by Foly. van Dam., "Computer Graphics, principles and practice", Addition Wesley Publication, image-based rendering proposed by Paul E. Debevec et al., "Modeling and Rendering Architecture from Photographs: A hybrid geometry and image-based approach", Proceedings of SIGGRAPH 96, pp.11–20 wherein a plurality of paste images to a general shape are prepared and a paste image is switched and plotted in accordance with a viewpoint direction so that detailed plotting of a high quality can be executed, a method proposed by Huges Hoppe, "Mesh Optimization", Proceedings of Siggraph 93, pp19–26 wherein shape data of different particularity degrees are produced from the most particular shape of a three-dimensional model and a shape of a model is approximated, and texture mapping proposed by Foly. van Dam., "Computer Graphics, principles and practice", pp.827–828, Addison Wesley Publication, 1996 wherein textures having different resolutions are prepared in advance and a texture of a resolution suitable for a size of a three-dimensional model on a display is pasted to a surface of the three-dimensional model.

Further, in recent years, development of a plotting processing method for plotting an existing object with an increasing accuracy has been proceeded. For example, a method of changing a plotting processing method in response to a shape of a model to be plotted has been proposed. According to the method, from among displacement mapping by which a concave and convex configuration of a surface of a model can be plotted with a high degree of accuracy, flat shading which is suitable to paint a surface of a model with a single color but cannot plot a concave and convex configuration accurately and bump mapping by which a concave and convex configuration can be plotted with an intermediate degree of accuracy between those by the displacement mapping and the flat shading, an optimum plotting processing method is selected in response to a shape of a portion of a model to be plotted. Details of the method are disclosed in Barry G. Becker, "Smooth Transitions between Bump Rendering Algorithm", Proceedings of Siggraph 93, pp.183–190.

Another method has been proposed wherein the color of a surface of an object (the color is hereinafter referred to as surface color) which varies depending upon the position of a viewpoint or the position of a light source for lighting an object is measured in advance and surface color data measured are approximated in response to the position of a viewpoint or the position of a light source when a model is plotted. If the direction V in which a user observes an object (or the direction in which a camera for picking up an image of the object is directed) (the direction is hereinafter referred to as viewpoint direction) is set, for example, as seen in FIG. 17A, to a direction V1 perpendicular to the plane of the figure and the direction L in which a light source for lighting the object is directed (the direction is hereinafter referred to as light source direction) is set, for example, to a direction light source direction L1 in which the object is lighted obliquely from left above, then a highlight is formed at a left upper portion of the object.

Since the surface color of an object varies finely stepwise (gradually) in the proximity of a highlight, with the proposed plotting processing method, the portion at and around the position at which the highlight is present is approximated comparatively finely while the remaining portion is approximated comparatively roughly. For example, when an object is modeled with polygons of a wire frame display as seen in FIG. 17B, a portion of the object at which a highlight is present is displayed with more dense wire frames and approximated more accurately than the other portion of the object. Therefore, an object can be plotted more accurately than where it is approximated alternatively such that it is displayed with uniform wire frames as seen in FIG. 18.

FIG. 19A shows an image of the object when the viewpoint direction V is maintained at the direction V1 perpendicular to the plane of FIG. 19 whereas the light source direction L is changed from the light source direction L1 to another light source direction L2, and FIG. 19B shows a model corresponding to the image. In this instance, the model is approximated in accordance with a highlight formed on the left side of the object.

It is to be noted that a method of optimizing the reflection characteristic of a point on the surface of an object in such an instance to produce image data of the surface color (the data are hereinafter referred to as surface color data) is proposed in the model of Lambert, the model of Phong or the model of Cook-Torrance, and is disclosed in Andrew S. Glassner, "Principles of Digital Image Synthesis", Morgan Kaufmann Publication.

While methods of plotting a model with a high degree of accuracy are being studied in this manner, since the plotting processing method described above produces a model with the surface color and the shape of the model optimized separately from each other, it after all has a subject to be solved in that a model of an existing object cannot be plotted accurately even at present.

Further, since optimization of data is involved, an apparatus which executes a plotting process has a subject to be solved in that it cannot execute a plotting process efficiently.

SUMMARY OF THE INVENTION

It is an object of the present invention to provide an image processing apparatus and method and an information providing medium by which a model can be plotted efficiently and accurately.

In order to attain the objects described above, according to a first aspect of the present invention, there is provided an image processing apparatus for producing a model of an object, including inputting means for inputting model data of the object having shape data of the object, and control means for allocating an optimum process to each of a plurality of regions which compose the model data.

According to a second aspect of the present invention, there is provided an image processing apparatus for performing display control of a model of an object, including inputting means for inputting model data with which a process is allocated to each of a plurality of regions of the model of the object, and plotting means for selecting a process allocated to each of the regions of the model data and plotting the region to which the process is allocated based on the selected process.

According to a third aspect of the present invention, there is provided an image processing method for producing a model of an object, including an inputting step of inputting model data of the object having shape data of the object, and a control step of allocating an optimum process to each of a plurality of regions which compose the model data.

According to a fourth aspect of the present invention, there is provided an image processing method for performing display control of a model of an object, including an inputting step of inputting model data with which a process is allocated to each of a plurality of regions of the model of the object, and a plotting step of selecting a process allocated to each of the regions of the model data and plotting the region to which the process is allocated based on the selected process.

According to a fifth aspect of the present invention, there is provided an information providing medium which provides a program to an information processing apparatus which includes a control apparatus which can execute a program, the program having an inputting command for inputting model data of the object having shape data of the object, and a control command for allocating an optimum process to each of a plurality of regions which compose the model data.

According to a sixth aspect of the present invention, there is provided an information providing medium which provides a program to an information processing apparatus which includes a control apparatus which can execute a program, the program having an inputting command for inputting model data with which a process is allocated to each of a plurality of regions of the model of the object, and a plotting command for selecting a process allocated to each of the regions of the model data and plotting the region to which the process is allocated based on the selected process.

According to a seventh aspect of the present invention, there is provided an information providing medium for providing image data to an information processing apparatus which can read in data, the image data being produced by an inputting step of inputting model data of the object including shape data of the object, and a control step of allocating an optimum process to each of a plurality of regions which compose the model data.

With the image processing apparatus and methods and information providing media, model data of an object including shape data of the object and surface color data of the object which correspond to each other are produced and optimized based on a plotting condition for plotting a model, and a model of the object is plotted based on the optimized model data. Consequently, the model of the object can be plotted efficiently and accurately.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a schematic view showing an image processing apparatus including a personal computer to which the present invention is applied;

FIG. 2 is a block diagram showing an example of a construction of the personal computer shown in FIG. 1;

FIG. 6 is a table showing a result of measurement performed with the image processing apparatus of FIG. 1;

FIG. 10 is a table illustrating a corresponding relationship between results of evaluation of plotting processing methods and processing selection conditions;

FIGS. 15A and 15B are diagrammatic views illustrating manners of a model expanded in a two-dimensional space and another model expanded in a three-dimensional space;

DESCRIPTION OF THE PREFERRED EMBODIMENT

Figure 3:
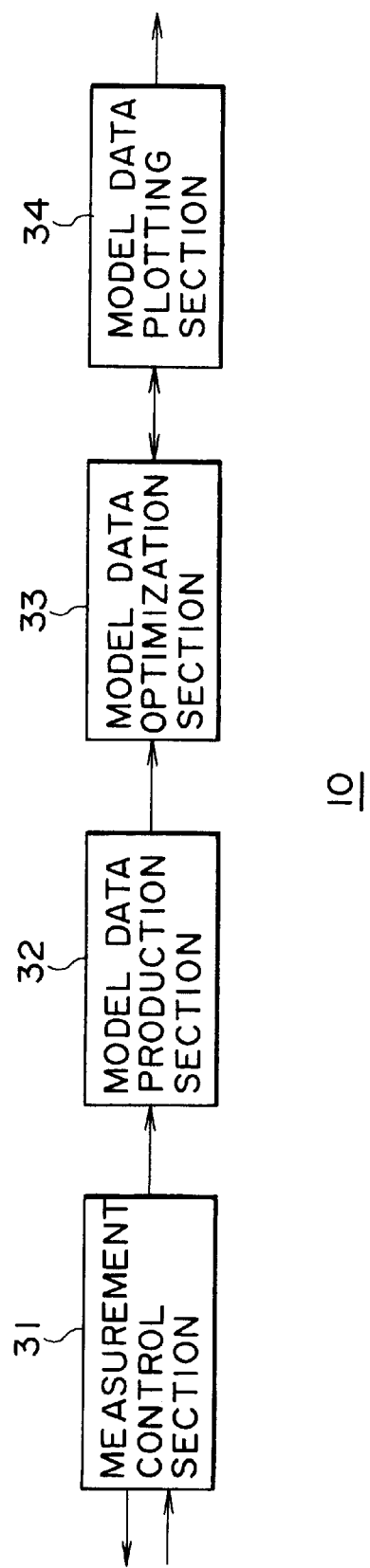
FIG. 3 is a block diagram showing an example of a functional construction of the personal computer shown in FIG. 1.

Referring first to FIG. 1, there is shown an image processing apparatus including a personal computer to which the present invention is applied. The personal computer 10 shown is connected to a camera moving apparatus 11 such that the camera moving apparatus 11 moves and positions a camera 12 to and at a predetermined position (hereinafter referred to as measurement position) in accordance with an instruction from the personal computer 10. The camera 12 uses, for example, white light or laser light to measure the shape and the surface color of a measurement object A and supplies a result of the measurement (shape data and surface color data) to the personal computer 10.

A light source moving apparatus 13 moves and positions a light source 14 to and at a predetermined position (hereinafter referred to as light source position) in accordance with an instruction from the personal computer 10. The light source 14 uses, for example, white light to light the measurement object A.

The personal computer 10 transmits the measurement position of the camera 12 to the camera moving apparatus 11 and transmits the light source position of the light source 14 to the light source moving apparatus 13 to control the measurement of the shape and the surface color of the measurement object A. Further, the personal computer 10 performs predetermined processes which are hereinafter described for shape data and surface color data of the measurement object A supplied thereto from the camera 12 to produce model data of the measurement object A and controls a display unit 26 to display a model of the measurement object A based on the model data.

FIG. 2 shows an example of a construction of the personal computer 10. Referring to FIG. 2, the personal computer 10 shown includes a CPU (Central Processing Unit) 21 which executes various processes in accordance with a program stored in a ROM (Read Only Memory) 22 or on a hard disk 27. Data necessary for the CPU 21 to execute the various processes are stored in a RAM (Random Access Memory) 23. An image to be displayed on the display unit 26 is stored in a VRAM (Video RAM) 24.

An inputting section 25 is manually operated by a user when the user inputs an instruction to the CPU 21. The display unit 26 is formed from, for example, an LCD (Liquid Crystal Display) and displays desired characters, graphic forms or images thereon. The hard disk 27 stores a program including commands for image processes which are hereinafter described and data such that they can be recalled therefrom.

A communication section 28 is connected to the camera moving apparatus 11 and the light source moving apparatus 13 and transmits data to them therethrough. The communication section 28 is connected also to the camera 12 and receives data from the camera 12. An interface 29 is interposed between the components 25, 26, 27 and 28 described above and the CPU 21 and executes interfacing processing.

FIG. 3 shows an example of a functional construction of the personal computer 10 when a model of the measurement object A is displayed (plotted). A measurement control program section (hereinafter referred to simply as measurement control section) 31 controls the light source moving apparatus 13 to move the light source 14 to a light source position. The measurement control section 31 further controls the camera moving apparatus 11 to move the camera 12 to perform a measurement, and receives a result of the measurement from the camera 12 and outputs the measurement result to a model data production program section (hereinafter referred to simply as model data production section) 32.

The model data production section 32 performs a model data production process (which is hereinafter described) for shape data and surface color data supplied thereto from the measurement control section 31 to produce model data C and outputs the model data C to a model data optimization program section (hereinafter referred to simply as model data optimization section) 33.

The model data optimization section 33 performs a model data optimization process (hereinafter described) for the model data supplied thereto from the model data production section 32 based on predetermined conditions supplied thereto from a model plotting program section (hereinafter referred to simply as model data plotting section) 34 in advance to produce optimization model data $C_A$ and outputs the optimization model data $C_A$ to the model data plotting section 34.

The model data plotting section 34 stores the optimization model data $C_A$ supplied thereto from the model data optimization section 33 into the VRAM 24 and supplies the optimization model data $C_A$ to the display unit 26 so that the optimization model data $C_A$ may be displayed on the display unit 26.

Figure 4:
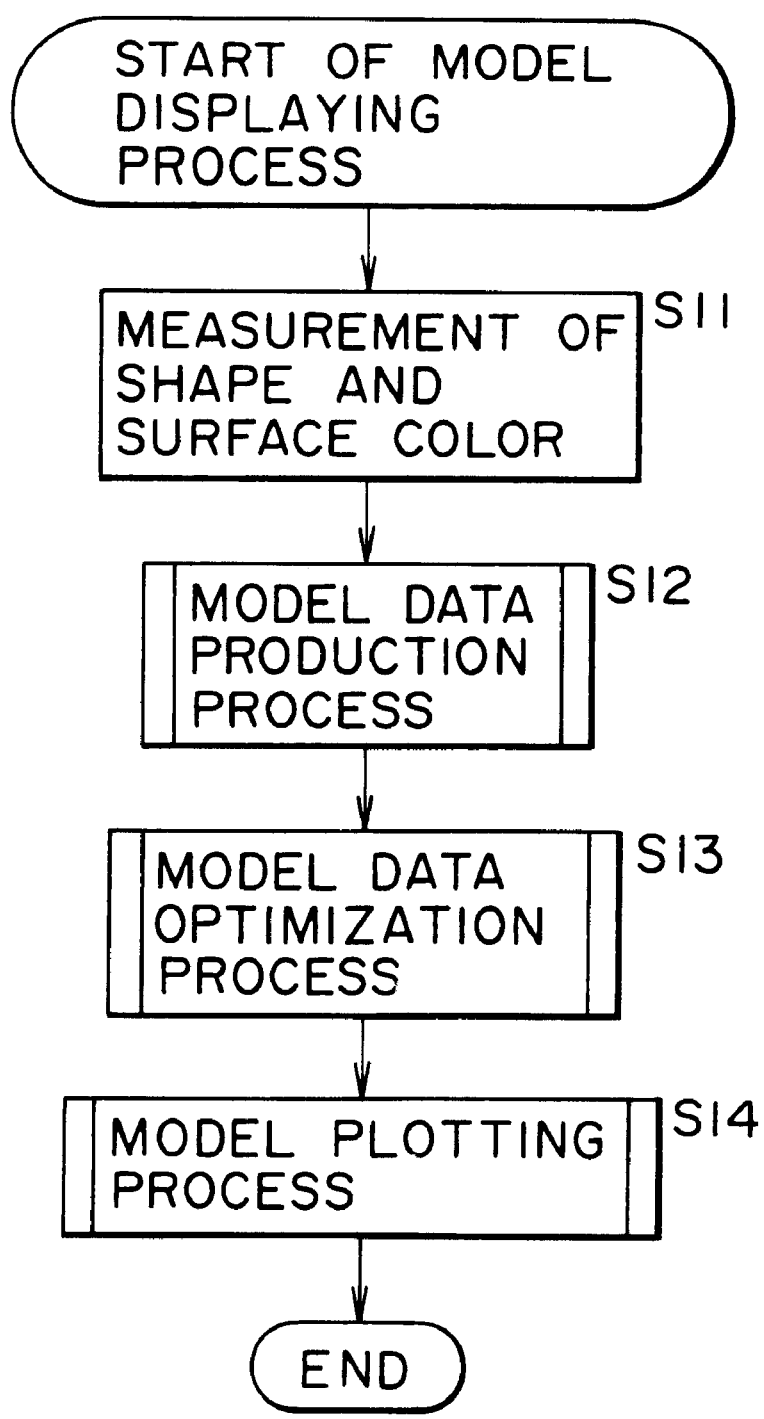
FIG. 4 is a flow chart illustrating a processing procedure of the personal computer shown in FIG. 1 when a model is plotted.

Subsequently, a processing procedure to produce and display a model of the measurement object A is described with reference to a flow chart of FIG. 4.

Figure 5:
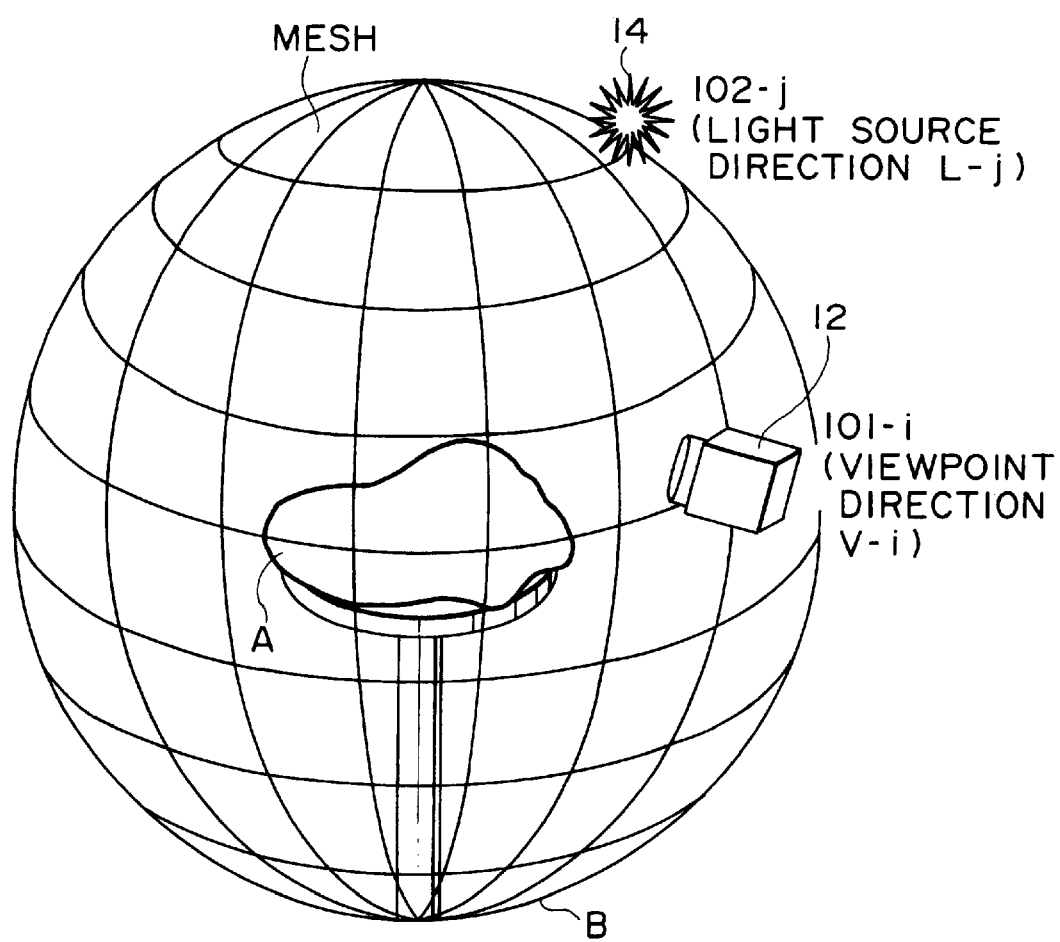
FIG. 5 is a schematic illustration showing a measurement position and a light source position.

When the inputting section 25 is manually operated by the user to input an instruction for causing a model of the measurement object A to be displayed and plotting conditions such as a size of the model to be displayed, a viewpoint direction V and a light source direction L to the CPU 21, then the CPU 21 (measurement control section 31) controls, in step S11, the camera moving apparatus 11 to successively move the camera 12, for example, to predetermined positions (measurement positions) 101-i (i=1, 2, 3, . . . , N) corresponding to imaginary meshes on the surface of a sphere B centered at the measurement object A as seen in FIG. 5, and controls the light source moving apparatus 13 to successively move the light source 14 to predetermined positions (light source positions) 102-j (j=1, 2, 3, . . . , M) corresponding to the meshes on the surface of the sphere B similarly to measure the shape and/or the surface color of the measurement object A.

When the shape of the measurement object A is to be measured, the camera 12 is successively positioned to the measurement positions 101-1 to 101-N, at which the shape of the measurement object A is measured from respective viewpoint directions V-1 to V-N. In other words, N shape data are obtained as a result of the measurement as seen in FIG. 6.

On the other hand, when the surface color of the measurement object A is to be measured, similarly as in the measurement of the shape of the measurement object A, the camera 12 is successively positioned to the measurement positions 101-1 to 101-N, at which the surface color of the measurement object A is measured from the respective viewpoint directions V-1 to V-N. In this instance, after the camera 12 is positioned to any measurement position 101-i (viewpoint direction V-i), the light source 14 is successively positioned to light source positions 102-1 to 102-M. In other words, the surface colors of the measurement object A when lighted with the light source 14 from light source directions L-1 to L-M at the light source positions 102-1 to 102-M are measured. Consequently, N×M surface color data are obtained as a result of the measurement as seen from FIG. 6.

It is to be noted that the measured surface color data are image data having RGB components. For example, the surface color of the measurement object A lighted by the light source 14 from the light source direction L-1 and measured by the light source 14 from the viewpoint direction V-1 in FIG. 6 is darker than that of the measurement object A lighted by the light source 14 from the light source direction L-M and measured from the viewpoint direction V-1.

The shape data and the surface color data obtained by the measurement in this manner are supplied to the model data production section 32.

When the shape data and the surface color data are received from the measurement control section 31, the model data production section 32 executes a model data production process for producing model data C from the received data in step S12. Details of the model data production process in step S12 are represented by a flow chart of FIG. 7.

Figure 7:
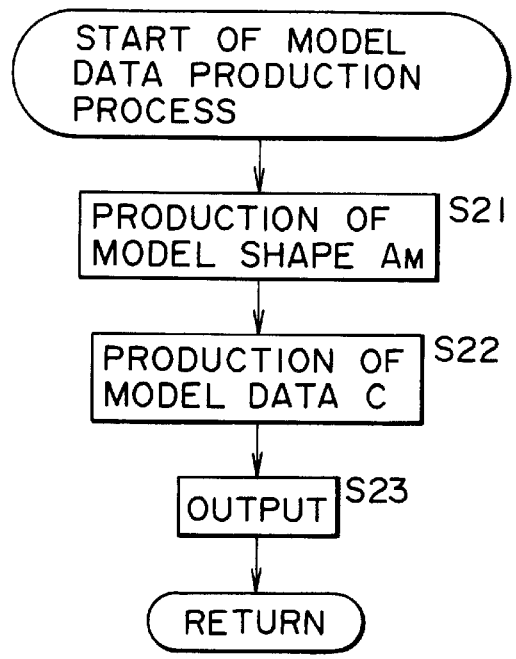
FIG. 7 is a flow chart illustrating a processing procedure of a model data production process in the processing procedure illustrated in FIG. 4.

Referring to FIG. 7, the model data production section 32 pastes the N shape data together to produce a general shape of the measurement object A (the shape is hereinafter referred to as model shape) in step S21. The pasting of shape data here is performed based on the method disclosed in Breg Turk, "Zippered Polygon Meshes from Range Images", Proceedings of Siggraph 94, pp.311–318, and for example, overlapping portions of the N shape data are detected and joining positions are determined based on a result of the detection. Then, the N shape data are pasted together in accordance with the determined joining positions to produce a model shape $A_M$ of the measurement object A. It is to be noted that the model shape $A_M$ of the measurement object A produced here is a group of points specified by three-dimensional coordinates (x, y, z) (each of the points is hereinafter referred to as measurement point P).

In step S22, the model data production section 32 performs a pasting process of the N×M surface color data for the model shape $A_M$ produced in step S21. More particularly, the individual N surface color data measured from the viewpoint direction V-i are projected at a portion of the model shape $A_M$, which can be seen from the viewpoint direction V-i, in a corresponding relationship to the measurement conditions such as, for example, the focal length and the angle of a lens (not shown).

After the surface color data are pasted to the model shape $A_M$ in this manner, the image data at each of the measurement points P which compose the model shape $A_M$ are converted into model data C in accordance with a function F which includes s, t, $\theta V1$, $\theta V2$, $\theta L1$ and $\theta L2$ as parameters as given by the following expression:

Model data $C=F(s, t, \theta V1, \theta V2, \theta L1, \theta L2)$ where s and t are parameters used in a function S for converting three-dimensional coordinates into tow-dimensional coordinates. For example, a point (x, y, z) on a three-dimensional space having X-, Y- and Z-axes is converted into another point (s, t) on a two-dimensional space having an axis S and another axis T.

Figure 8:
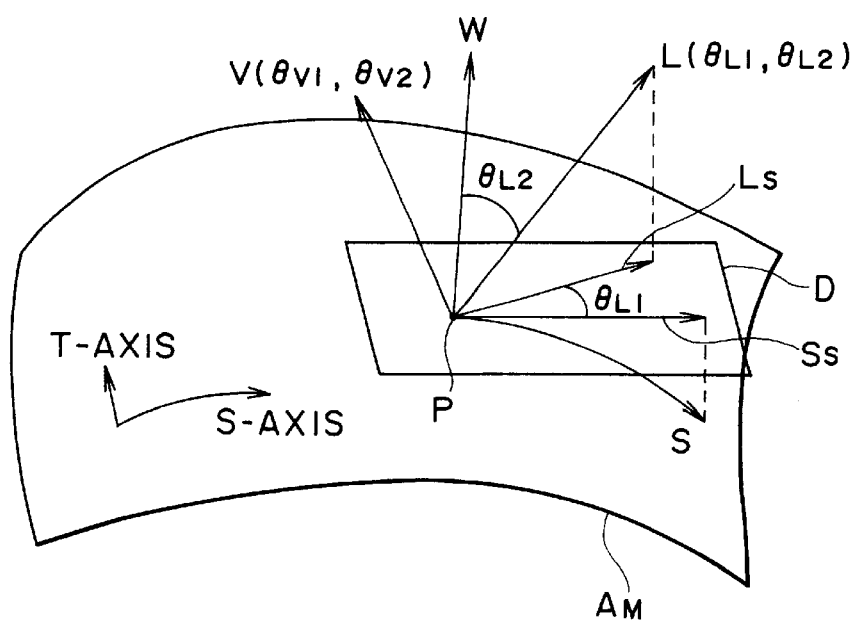
FIG. 8 is a diagrammatic view illustrating a manner of determination of a light source direction.

$\theta L1$ and $\theta L2$ in the expression above are parameters for converting a light source direction L into data. $\theta L2$ is determined as an angle between a normal W to the model shape $A_M$ which passes the measurement point P and the light source direction L as seen from FIG. 8. $\theta L1$ is determined as an angle between a projected line $S_S$ of a line s extending along the axis S which passes the measurement point P on a plane D on which the normal W is a perpendicular line and a projected line $L_S$ of the light source direction L on the plane D. The light source direction L ($\theta L1$, $\theta L2$) is converted into data with $\theta L1$ and $\theta L2$ determined in this manner.

$\theta V1$ and $\theta V2$ in the expression given above are parameters for converting a viewpoint direction V with respect to the measurement point P into data. $\theta V1$ is determined similarly to $\theta L1$, and $\theta V2$ is determined similarly to $\theta L2$. The viewpoint direction V ($\theta V1$, $\theta V2$) is converted into data with $\theta V1$ and $\theta V2$ determined in this manner.

In this manner, shape data and surface color data are incorporated in a corresponding relationship to each other into the model data C of the measurement point P based on the six parameters (six-dimensionally) of s, t, $\theta L1$, $\theta L2$, $\theta V1$ and $\theta V2$.

In step S23, the model data production section 32 outputs the model data C produced in step S22 to the model data optimization section 33. Thereafter, the control of the CPU 21 advances to step S13 of FIG. 4.

Referring back to FIG. 4, in step S13, the model data optimization section 33 performs a model data optimization process for the model data C received from the model data production section 32. Details of the model data optimization processing in step S13 are represented in a flow chart of FIG. 9.

Figure 9:
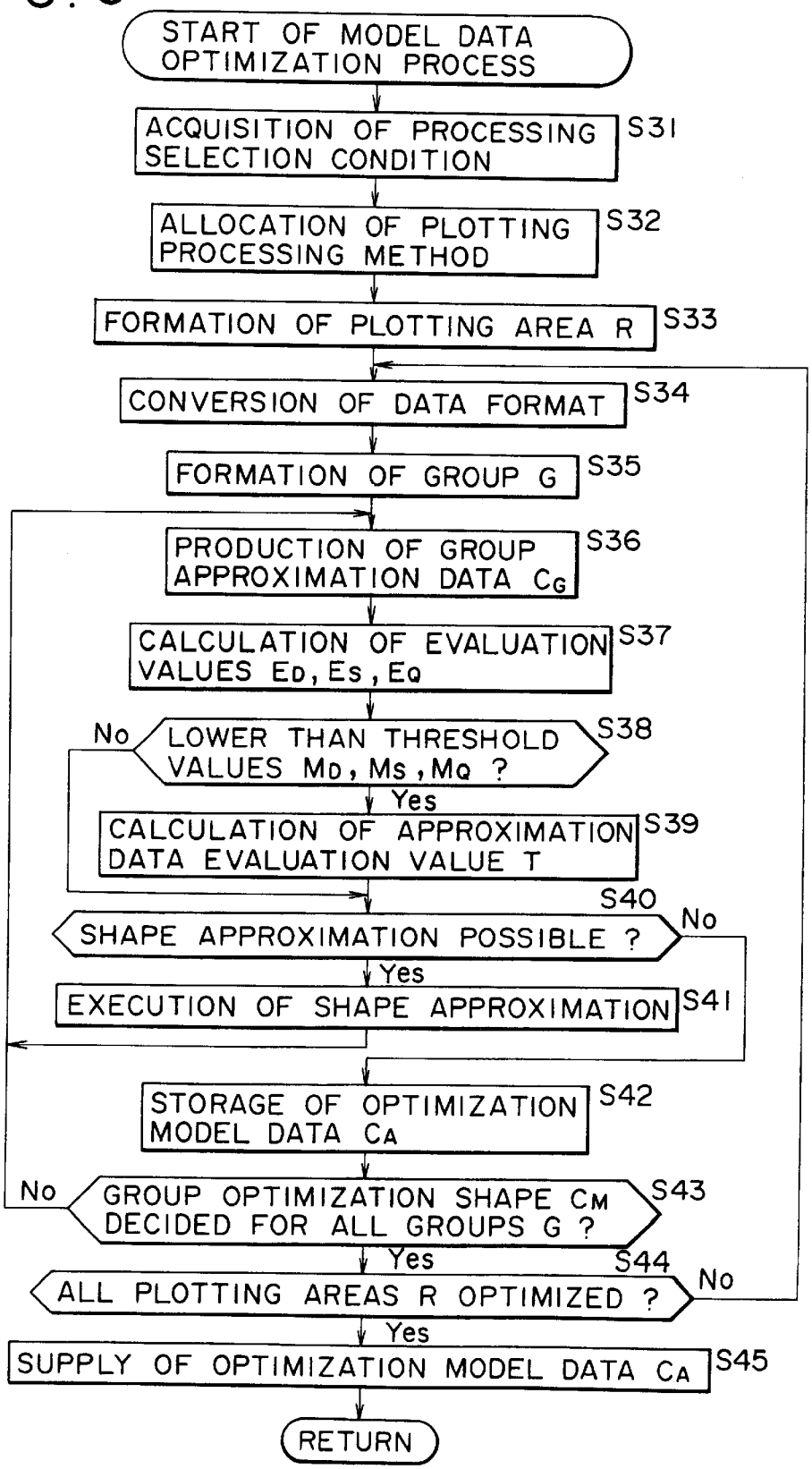
FIG. 9 is a flow chart illustrating a processing procedure of a model data optimization process in the processing procedure illustrated in FIG. 4.

Referring to FIG. 9, the model data optimization section 33 acquires plotting processing method selection conditions (hereinafter referred to as processing selection conditions) supplied thereto from the model data plotting section 34. In the present embodiment, as the processing selection conditions, a size of a model on a display calculated based on the viewpoint direction V and the light source direction L inputted from the inputting section 25 formerly, setting of a plotting method by a user, an arithmetic processing performance of the CPU 21, and a data transmission performance which depends upon a transmission processing performance of the communication section 28, a storage capacity of the hard disk 27 and a capacity of a transmission line are supplied from the model data plotting section 34 to the model data optimization section 33.

Then in step S32, the model data optimization section 33 selectively allocates, for example, one of four plotting processing methods A to D given below to each of the measurement point P of the model data C supplied thereto from the model data production section 32 in accordance with the processing selection conditions received from the model data plotting section 34.

Light field rendering method (plotting processing method A).

Method which employs displacement mapping which allows a concave and convex configuration of a plane to be regenerated finely and texture mapping which plots in such a manner as to paste textures to the surface of a model in combination (plotting processing method B), Method based on an Oren-Nayar lighting model wherein plotting is performed based on a concave and convex configuration of the surface and a reflection factor (plotting processing method C), and Method based on a Phong lighting model wherein plotting is performed based on a reflection factor which depends upon the material of the object (plotting processing method D).

Details of the plotting processing method D are disclosed in Foley, "Computer Graphic. principles and practice", pp.729–730.

The model data optimization section 33 selects, based on the characteristics of the plotting processing methods given above, one of the plotting processing methods which is most suitable to plot a portion of the model shape $A_M$ to which each measurement point P corresponds. However, the selection is limited by processing selection conditions.

Subsequently, how the selection of a plotting processing method is limited by processing selection conditions is described with reference to FIG. 10. FIG. 10 illustrates relationships between evaluation results of the four plotting processing methods A to D with regard to plotting processing method evaluation items (hereinafter referred to as processing evaluation items) 201 and processing selection conditions. In this instance, the processing evaluation items 201 include a plotting quality 211, a plotting processing load 212 and a data amount 213. With regard to the plotting quality 211, a plotting processing method by which plotting of a high quality can be executed such as the plotting processing method A is evaluated high. In FIG. 10, ⊙ signifies high evaluation; ○ signifies medium evaluation; and × signifies low evaluation.

In regard to the plotting processing load 212, a plotting processing method wherein the load of plotting processing (for example, the processing load to the CPU 21) is low because, for example, it does not require high arithmetic processing, such as the plotting processing methods A and D, is evaluated high. In regard to the data amount 213, a plotting processing method which requires, for example, much data in order to perform plotting processing, such as the plotting processing method A, is evaluated low.

Where a model is displayed comparatively large, for example, the picture quality exhibits comparatively great deterioration when compared with the model is displayed comparatively small. From this fact, where a model is displayed comparatively large in a processing selection condition, a plotting processing method which allows plotting processing of a high quality, that is, a plotting processing method which is evaluated high in regard to the plotting quality 211, such as, for example, the plotting processing method A, need be selected preferentially. on the other hand, when, for example, the arithmetic processing performance is low as a processing selection condition, a plotting processing method which does not impose a load on plotting processing, that is, a plotting processing method which is evaluated high in regard to the plotting processing load 212, such as, for example, the plotting processing method A or D, need be selected preferentially. However, when the data transmission capacity is low, for example, a plotting processing method wherein the data amount to be processed is small, that is, a plotting processing method which is evaluated high in regard to the data amount 213, such as, the plotting processing method D, need be selected preferentially.

Since the size of a model on a display, the processing capacity of the personal computer 10 and so forth are also taken into consideration in this manner, a plotting processing method which can execute plotting processing most efficiently can be selected.

Then in step S33, the model data optimization section 33 performs grouping of the measurement points P to each of which a plotting processing method has been allocated in step S32 such that successive ones of those measurement points P to which the same plotting processing method is allocated are determined as a group. Thus, the model data optimization section 33 forms, for example, K plotting regions R-1 to R-K.

In step S34, the model data optimization section 33 converts the data format of the model data C at the measurement points P in a plotting region R-k (k=1, 2, 3, . . . , K) into a data format suitable for the plotting processing method allocated to the model data C.

In step S35, the model data optimization section 33 performs grouping of the measurement points P in the plotting region R-k such that the model data C which are near to each other are determined as a group. The model data optimization section 33 thus forms, for example, Q groups G-1 to G-Q. Then in step S36, the model data optimization section 33 approximates the model data C of the measurement points P in the group G-q (q=1, 2, 3, . . . , Q) to produce one approximation data (hereinafter referred to as group approximation data) $C_G$.

Then in step S37, the model data optimization section 33 evaluates the group approximation data $C_G$ produced in step S36 based on approximate data evaluation items 401. In the present example, the approximate data evaluation items 401 include a data amount 411, a plotting processing load 412 and a plotting quality 413.

In regard to the data amount 411, for example, as the data amount in the group G-q increases, the value of an evaluation value $E_D$ of the same increases. In regard to the plotting processing load 412, when much time is required to plot the portion of the group G-q, the value of an evaluation value $E_S$ of the same is high. In regard to the plotting quality 413, when the deterioration of the plotting quality, for example, by approximation of the model data C of the measurement point P to the group approximation data $C_G$ is great, the value of an evaluation value $E_Q$ of the same is high.

After the group approximation data $C_G$ are evaluated with the approximate data evaluation items 401 and the evaluation values $E_D$, $E_S$ and $E_Q$ are determined in this manner, the control of the model data optimization section 33 advances to step S38, in which the model data optimization section 33 determines whether or not the evaluation values $E_D$, $E_S$ and $E_Q$ are lower than threshold values $M_D$, $M_S$ and $M_Q$ set for them in advance, respectively. If all of the evaluation values $E_D$, $E_S$ and $E_Q$ are lower than the threshold values $M_D$, $M_S$ and $M_Q$, respectively (all of the relational expressions $E_D<M_D$, $E_S<M_S$, and $E_Q<M_Q$ are satisfied), the control of the model data optimization section 33 advances to step S39.

Figure 11:
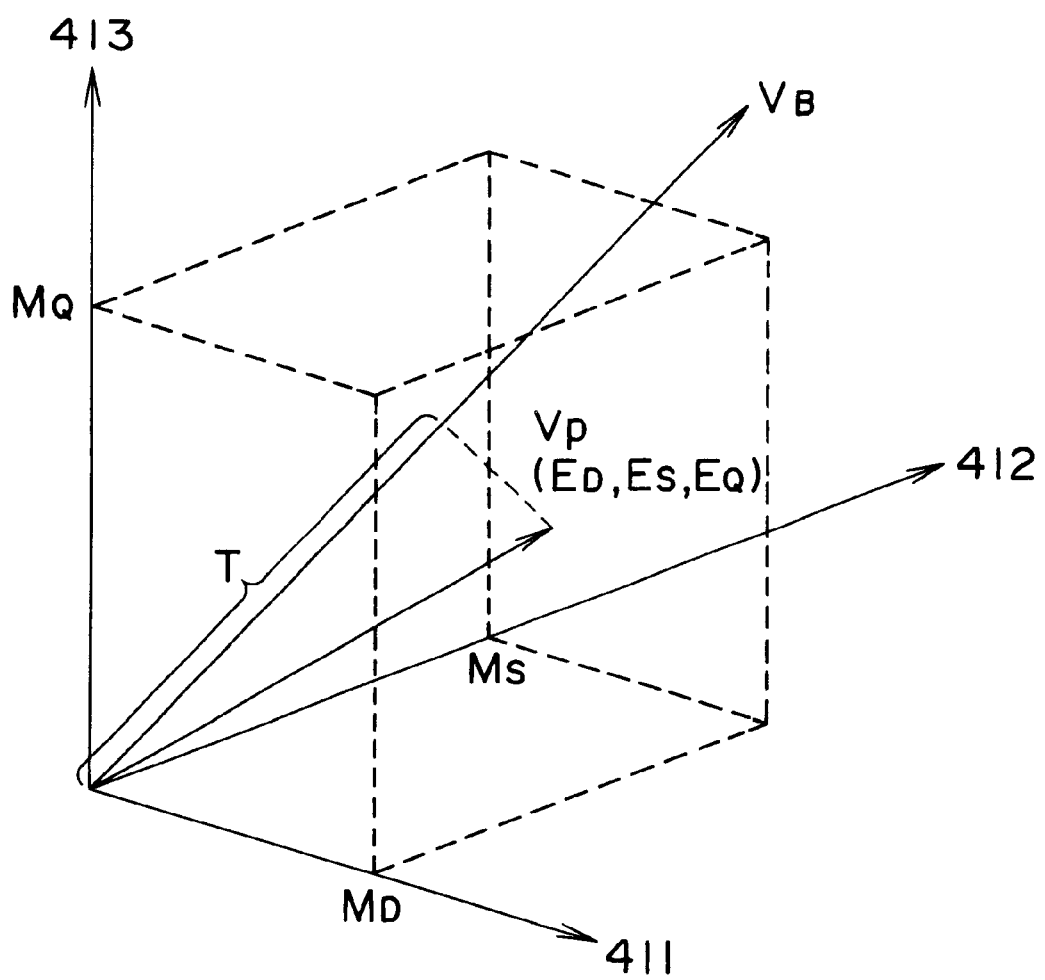
FIG. 11 is a diagrammatic view illustrating a method of calculation of an approximation data evaluation value.

In step S39, the model data optimization section 33 calculates an approximation data evaluation value T from the evaluation values $E_D$, $E_S$ and $E_Q$. In this instance, in a three-dimensional space whose coordinates are given by the data amount 411, plotting processing load 412 and plotting quality 413 as seen in FIG. 11, an evaluation vector $V_P(E_D, E_S, E_Q)$ formed from the evaluation values $E_D$, $E_S$ and $E_Q$ corresponding to the coordinates is set. Further, an evaluation reference vector $V_B$ formed by weighting the data amount 411, plotting processing load 412 and plotting processing load 412 with predetermined weights is set. Thus, the model data optimization section 33 calculates the length of a projected line of the evaluation vector $V_P$ on the evaluation reference vector $V_B$ and temporarily stores a result of the calculation as an approximation data evaluation value T, for example, into the RAM 23.

Then in step S40, the model data optimization section 33 discriminates whether or not the group G-q has a shape which allows approximation.

Figure 12B:
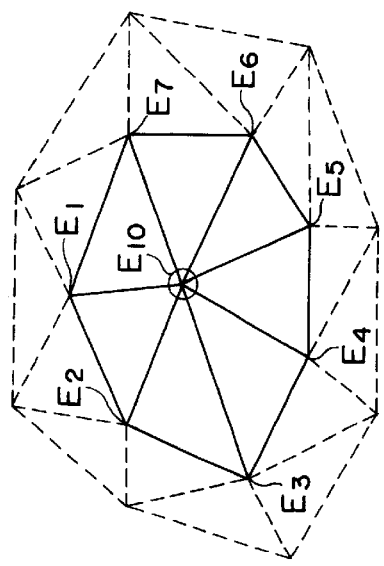
FIGS. 12A and 12B are diagrammatic views illustrating approximation in shape.
Figure 12A:
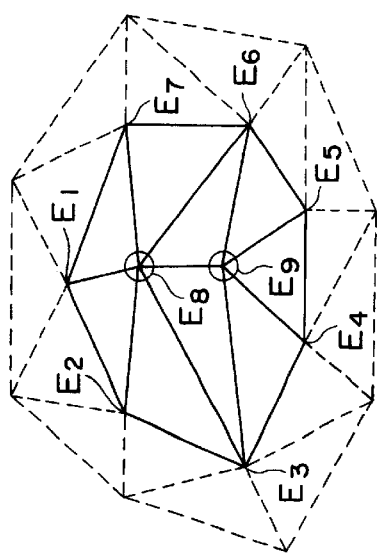

For example, in the case of a shape which includes a plurality of apexes $E_8$ and $E_9$ like an example of a polygon shown in FIG. 12A, the polygon can be approximated, by deleting the apexes $E_8$ and $E_9$ and providing a new apex $E_{10}$ instead, to a shape which has the apex $E_{10}$. A detailed technique for such approximation is disclosed in Japanese Patent Laid-Open No. Hei 9-231401 (which corresponds to U.S. patent application Ser. No. 08/755,129, filed Nov. 25, 1996). Thus, the model data optimization section 33 makes use of the principle just described to discriminate a plurality of those measurement points P each of which makes an apex are present in the group G-q expanded in the two-dimensional space having the axis S and the axis T, thereby to discriminate whether or not the group G-q has a shape which allows approximation.

Figure 13A:
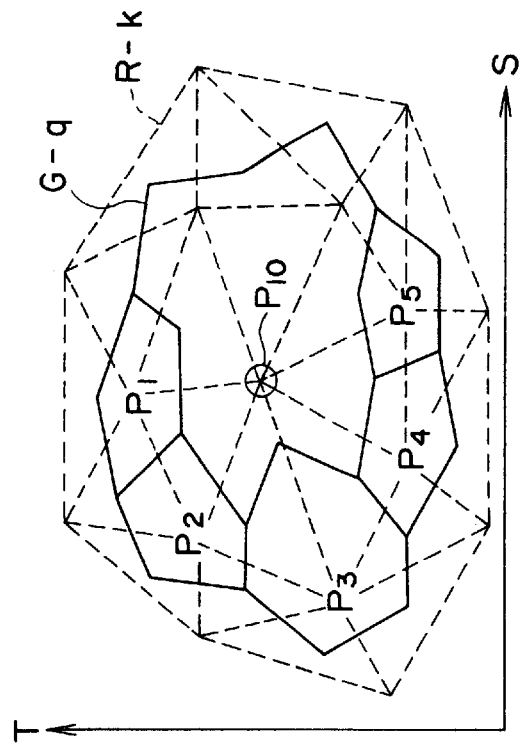
FIGS. 13A and 13B are diagrammatic views illustrating another approximation in shape.
Figure 13B:
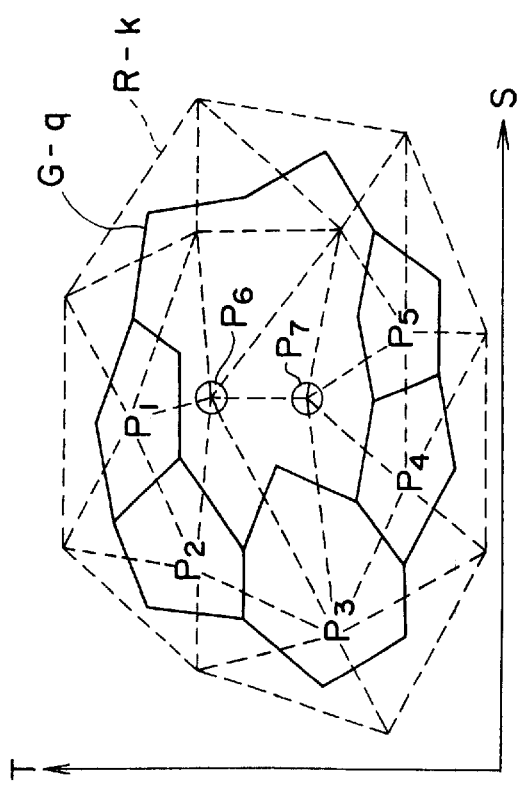

If the model data optimization section 33 discriminates in step S40 that a plurality of those measurement points P each of which makes an apex, for example, like measurement points $P_6$ and $P_7$ in FIG. 13A, are present in one group (group G-q), that is, that the group G-q has a shape which allows approximation, then the control of the model data optimization section 33 advances to step S41, in which the model data optimization section 33 approximates the shape of the group G-q in such a manner as seen in FIG. 13B, that is, the model data optimization section 33 combines the measurement points $P_6$ and $P_7$ into a single measurement point $P_{10}$.

It is to be noted that, in FIGS. 13A and 13B, broken lines represent edges of a shape provided by shape data and solid lines represent groups when the centers of gravity of polygons are interconnected.

Thereafter, the control of the model data optimization section 33 returns to step S36 so that the processing described above in the steps beginning with step S36 is executed repetitively until the shape of the group G-q cannot be approximated any more. In particular, each time the shape is approximated, group approximation data $C_G$ are produced (step S36) and evaluation values $E_D$, $E_S$ and $E_Q$ for the approximate data evaluation items 401 are calculated (step S37), and then an approximation data evaluation value T (step S39) is calculated based on a result of the evaluation and stored.

In step S38, if the model data optimization section 33 discriminates that any one of the evaluation values $E_D$, $E_S$ and $E_Q$ is equal to or higher than a corresponding one of the threshold values $M_D$, $M_S$ and $M_Q$, then the control of the model data optimization section 33 skips step S39 and advances directly to step S40. In this instance, the model data optimization section 33 determines that approximation of the model data C is inappropriate, and therefore does not determine the approximation data evaluation value T of the group approximation data $C_G$.

If it is discriminated in step S40 that the group G-q does not have a shape which allows approximation, then the control of the model data optimization section 33 advances to step S42. In step S42, the model data optimization section 33 selects, from among the approximation data evaluation values T calculated and stored in step S39, that one of the approximation data evaluation values T which has the lowest value, and stores a shape (hereinafter referred to as group optimization shape) $C_M$ when the approximation data evaluation value T is calculated and the group approximation data $C_G$ (in the following description, when the group optimization shape $C_M$ and the group approximation data $C_G$ need not be distinguished from each other, they are collectively referred to as optimization model data $C_A$) onto the hard disk 27. Thereafter, the control of the model data optimization section 33 advances to step S43.

In step S43, the model data optimization section 33 determines whether or not the group optimization shape $C_M$ has been determined for all of the groups G formed in the plotting region R-k. If the model data optimization section 33 determines that there remains a group G for which the group optimization shape $C_M$ has not been determined as yet, then the control of the model data optimization section 33 returns to step S36 to subsequently execute the processing in the steps beginning with step S36 for the next group G-q (=q+1).

If the model data optimization section 33 determines in step S43 that the group optimization shape $C_M$ has been determined for all of the groups G formed in the plotting region R-k, that is, if the model data optimization section 33 determines that the plotting region R-k has been optimized, then the control of the model data optimization section 33 advances to step S44.

In step S44, the model data optimization section 33 determines whether or not all of the plotting regions R formed in step S33 have been optimized. If it is determined that a plotting regions R which has not been optimized as yet remains, then the control of the model data optimization section 33 returns to step S34 so that the processing in the steps beginning with step S34 is subsequently executed for the next plotting region R-k (=k+1).

If it is determined in step S44 that all of the plotting regions R have been optimized, then the control of the model data optimization section 33 advances to step S45, in which the model data optimization section 33 supplies the stored optimization model data $C_A$ of the plotting regions R to the model data plotting section 34. Thereafter, the control of the model data optimization section 33 advances to step S14 of FIG. 4.

Referring back to FIG. 4, in step S14, the model data plotting section 34 executes a model plotting process based on the optimization model data $C_A$ received from the model data optimization section 33. Details of the model plotting processing in step S14 are represented in the flow chart of FIG. 14.

Figure 14:
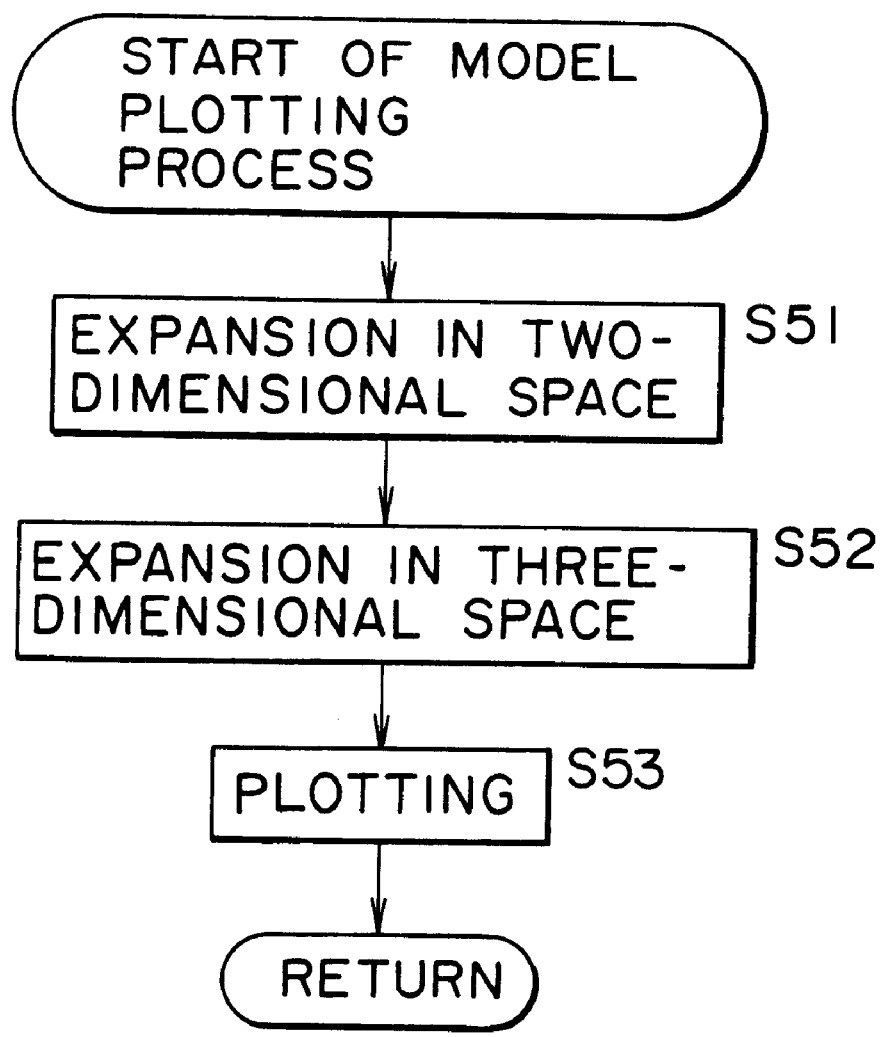
FIG. 14 is a flow chart illustrating a processing procedure of a model plotting process in the processing procedure illustrated in FIG. 4.

Referring to FIG. 14, the model data plotting section 34 expands, in step S51, the optimization model data $C_A$ received from the model data optimization section 33 in a two-dimensional space having an axis S and another axis T in a corresponding relationship to the light source direction L and the viewpoint direction V from among the plotting conditions inputted from the inputting section 25 formerly as seen in FIG. 15A. Then, in step S52, the model data plotting section 34 converts the optimization model data $C_A$ into data of a three-dimensional space as seen in FIG. 15B. By this, the optimized plotting regions R-1 to R-K (in the example of FIGS. 15A and 15B, K=10) are expanded in the three-dimensional space. It is to be noted that, in FIG. 15B, only the plotting region R-1 has the reference symbol annexed thereto for simplified illustration.

In step S53, the model data plotting section 34 plots the shape and the surface color of the model in the VRAM 24 based on the group optimization shape $C_M$ and the group approximation data $C_G$ of the optimization model data $C_A$ for the individual plotting regions R and causes the model to be displayed on the display unit 26. When the model plotting processing is completed, the processing illustrated in FIG. 4 comes to an end.

While, in the description above, one of the plotting processing methods A to D is selected in step S32, plotting processing methods evaluated with the plotting quality 211, plotting processing load 212 and data amount 213 as the processing evaluation items 201, for example, a plotting processing method disclosed, for example, in Andrew S. Grassner, "Principles of Digital Image Synthesis", pp.731–740, Morgan Kaufmann Publication, wherein a model is plotted based on both of the concave and convex configuration information and the reflection factor of the surface, may be selected.

Figure 16:
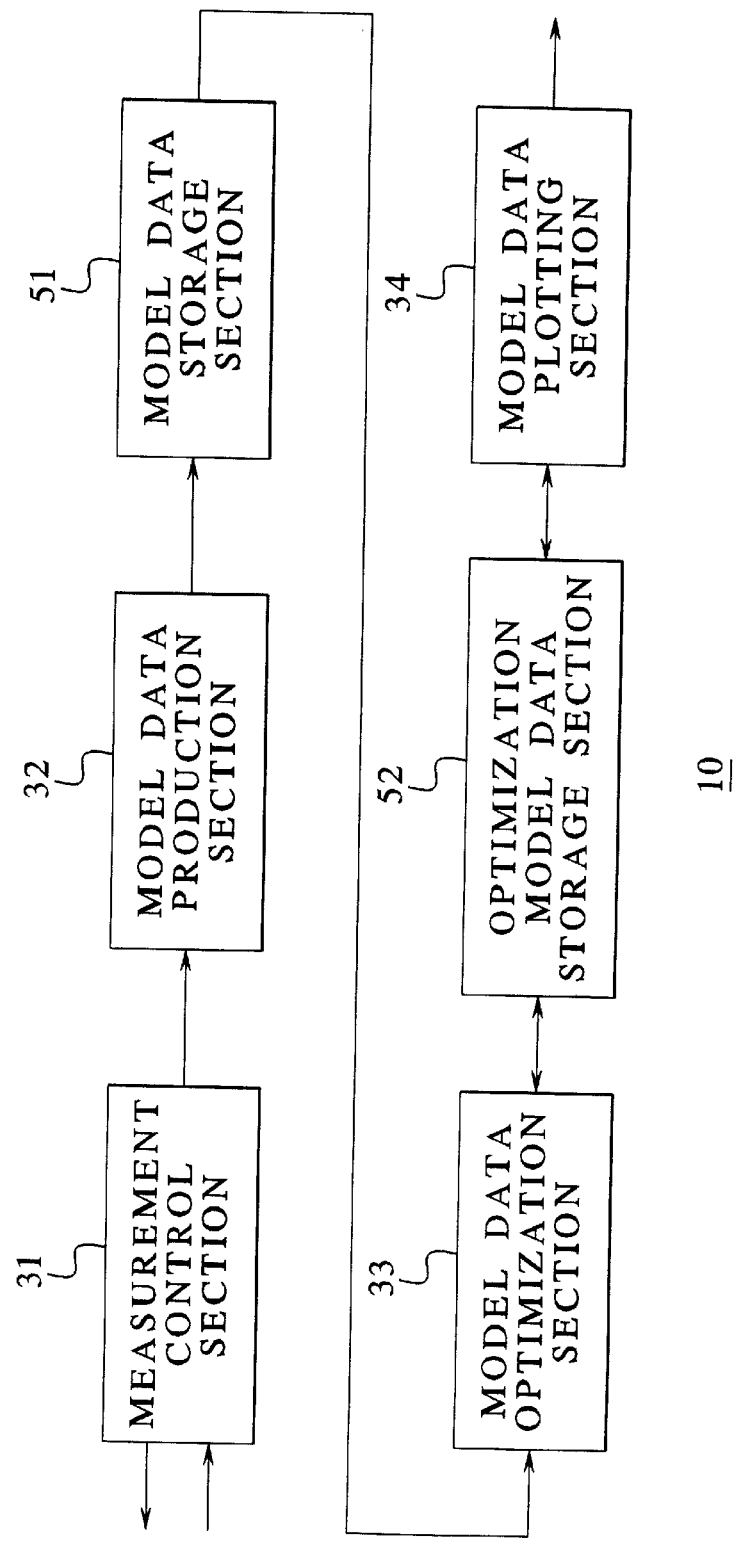
FIG. 16 is a block diagram showing another example of a functional construction of the personal computer shown in FIG. 1.
Figure 17A:
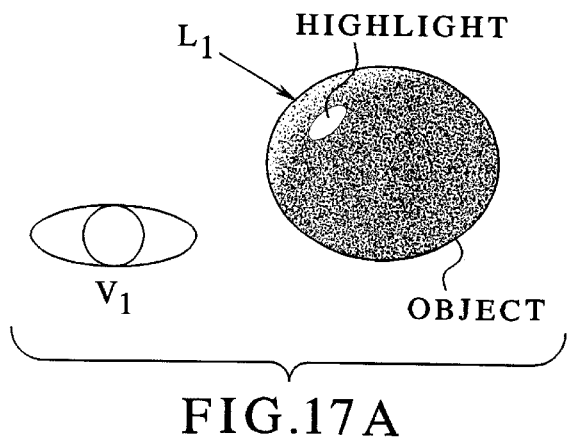
FIGS. 17A and 17B are schematic views showing a manner of appearance and a modeled display of a surface of an object.
Figure 17B:
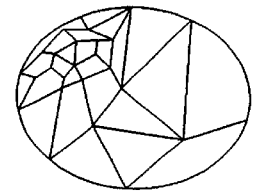
Figure 18:
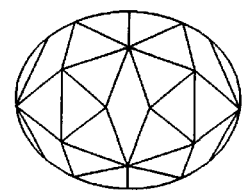
FIG. 18 is a schematic view showing another modeled display of the surface of the object shown in FIG. 17A.
Figure 19A:
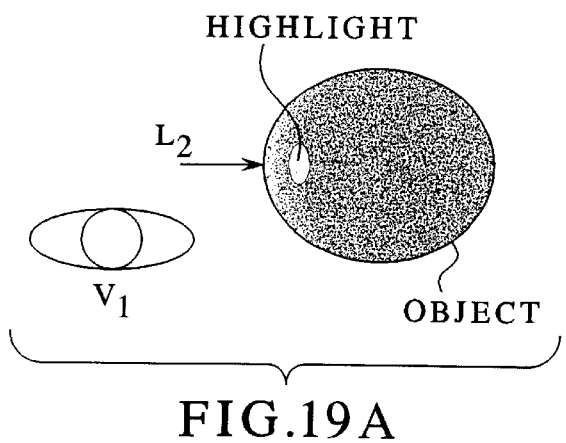
FIGS. 19A and 19B are schematic views showing another manner of appearance and another modeled display of the surface of the object shown in FIG. 17A.
Figure 19B:
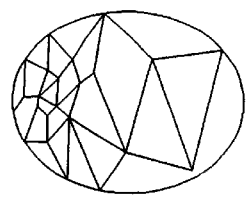

FIG. 16 shows another example of a functional construction of the personal computer 10 to which the present invention is applied. Referring to FIG. 16, the present functional construction of the personal computer 10 is a modification and different from that described hereinabove with reference to FIG. 3 in that it additionally includes a model data storage section 51 interposed between the model data production section 32 and the model data optimization section 33 and an optimization model data storage section 52 interposed between the model data optimization section 33 and the model data plotting section 34.

The model data storage section 51 stores model data produced by the model data production section 32.

The model data optimization section 33 suitably reads out the model data from the model data storage section 51 and executes the model data optimization process. In this instance, the model data optimization section 33 by itself sets several possible processing selection conditions, executes the model data optimization process corresponding to the plurality of processing selection conditions thus set to produce optimization model data $C_A$ for the processing selection conditions, and stores the optimization model data $C_A$ into the optimization model data storage section 52.

The model data plotting section 34 calculates the size of a model on a display, which depends upon, for example, the light source direction L, detects the arithmetic processing performance and the data transmission performance of the personal computer 10, and produces processing selection conditions. Then, the model data plotting section 34 reads out the optimization model data $C_A$ produced based on processing selection conditions nearer to the processing selection conditions from the optimization model data storage section 52, and plots with the optimization model data $C_A$.

Since model data are stored in the model data storage section 51 in this manner, the model data can be utilized many times. In other words, a model of an object with which model data have been produced can be displayed without performing measurement of the shape and the surface color of the object again.

Further, since optimization model data $C_A$ are produced in advance in accordance with presumed processing selection conditions and stored in the optimization model data storage section 52, if the presumed processing selection conditions are satisfied, then the optimization model data $C_A$ need not be produced each time a processing selection condition is varied.

It is to be noted that an information providing medium for providing a computer program for executing such processing as described above to a user may be a recording medium such as a magnetic disk like the hard disk 27, a CD-ROM or a solid-state memory, or a communication medium such as a network or a satellite through the communication section 28.

With the embodiment described above, since model data including shape data and surface color data corresponding to each other are produced and optimized based on a plotting condition, a model of an object can be plotted efficiently and accurately.

While a preferred embodiment of the present invention has been described using specific terms, such description is for illustrative purposes only, and it is to be understood that changes and variations may be made without departing from the spirit or scope of the following claims.

What is claimed is:

1. An image processing apparatus for producing a model of an object, comprising:

inputting means for inputting model data of the object including shape data of the object; and control means for allocating an optimum process to each of a plurality of regions which compose the model data, wherein said control means allocates a plotting method to each of the plurality of regions, and wherein said control means includes allocation means for allocating an optimum plotting method to each of composition data which compose the model data, and setting means for grouping the composition data which compose the model data based on the processes allocated to the individual composition data by said allocation means and the positions of the composition data to set a plurality of regions to the model data.

2. An image processing apparatus according to claim 1, wherein said control means further includes approximation means for approximating the model data in the plurality of regions set by said setting means.

3. An image processing apparatus according to claim 1, wherein said control means allocates a plotting method based on at least one of a size of the model on a display, a processing capacity of an arithmetic unit and a transmission capacity of a transmission line.

4. An image processing method for producing a model of an object, comprising:

an inputting step of inputting model data of the object including shape data of the object; and a control step of allocating an optimum process to each of a plurality of regions which compose the model data, wherein the control step allocates a plotting method to each of the plurality of regions, and wherein the control step includes an allocation step of allocating an optimum plotting method to each of composition data which compose the model data, and a setting step of grouping the composition data which compose the model data based on the processes allocated to the individual composition data by the allocation step and the positions of the composition data to set a plurality of regions to the model data.

5. An image processing method according to claim 4, wherein the control step further includes an approximation step of approximating the model data in the plurality of regions set by the setting step.

6. An image processing method according to claim 4, wherein the control step allocates a plotting method based on at least one of a size of the model on a display, a processing capacity of an arithmetic unit and a transmission capacity of a transmission line.

* * * * *